(12) United States Patent
Wei et al.

(10) Patent No.: US 9,799,174 B2
(45) Date of Patent: Oct. 24, 2017

(54) ELECTRONIC SYSTEM SHARING POWER OF DOORBELL, POWER SUPPLY DEVICE THEREOF, AND POWER SUPPLY METHOD THEREOF

(71) Applicant: Chicony Electronics Co., Ltd., New Taipei (TW)

(72) Inventors: Chia-Liang Wei, New Taipei (TW); Hsiao-Ching Hsu, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 15/076,928

(22) Filed: Mar. 22, 2016

(65) Prior Publication Data

US 2017/0193763 A1    Jul. 6, 2017

(30) Foreign Application Priority Data

Jan. 4, 2016   (CN) .......................... 2016 1 0004014

(51) Int. Cl.
*G08B 3/10* (2006.01)
*H02M 5/257* (2006.01)
*H02M 1/00* (2006.01)

(52) U.S. Cl.
CPC .............. *G08B 3/10* (2013.01); *H02M 5/257* (2013.01); *H02M 2001/0006* (2013.01)

(58) Field of Classification Search
CPC ....................................................... G08B 3/10
USPC ............................................................ 340/333
See application file for complete search history.

(56) References Cited

U.S. PATENT DOCUMENTS

| 5,748,074 A * | 5/1998 | Chomet | G08B 3/10 340/328 |
| 2011/0090068 A1* | 4/2011 | Langer | G08B 3/10 340/333 |

* cited by examiner

*Primary Examiner* — Qutbuddin Ghulamali
(74) *Attorney, Agent, or Firm* — Muncy, Geissler, Olds & Lowe, P.C.

(57) ABSTRACT

A power supply device sharing power of a doorbell includes two power contacts, an AC switch, an AC/DC conversion circuit, a doorbell actuator, a supply node, an enabling node, and a control node. When the AC switch is off, the AC/DC conversion circuit receives AC power through the two power contacts, generates DC power according to the AC power, and then outputs the generated DC power through the supply node to supply a post-stage circuit for operating. The doorbell actuator is configured to generate an enabling signal and outputting the generated enabling signal through the enabling node. The control node is configured to receive a control signal relative to the enabling signal, to have the AC switch turned on in response to the control signal to ring the doorbell.

19 Claims, 10 Drawing Sheets

ELECTRONIC SYSTEM SHARING POWER OF DOORBELL, POWER SUPPLY DEVICE THEREOF, AND POWER SUPPLY METHOD THEREOF

CROSS-REFERENCES TO RELATED APPLICATIONS

This non-provisional application claims priority under 35 U.S.C. §119(a) on Patent Application No. 201610004014.X filed in China, P.R.C. on 2016 Jan. 4, the entire contents of which are hereby incorporated by reference.

BACKGROUND

Technical Field

The instant disclosure relates to the design of a power supply circuit and, more particularly, to an electronic system sharing power of a doorbell, a power supply device thereof, and a power supply method thereof.

Related Art

There is usually a doorbell device in a residence, by which visitors can conveniently inform residents of their presence. The doorbell device mainly includes a doorbell for ringing and a switch for driving the doorbell to ring, wherein, the doorbell is installed inside the residence, and the switch of the doorbell is installed on the front door of the building such that visitors can conveniently hit the switch to drive the doorbell inside the residence to ring. Thus the doorbell device is indispensable to modern buildings. Power lines of the doorbell devices are usually preserved in buildings, to facilitate the installation of doorbells and switches. Although doorbell devices have continuously been developed and evolved into varied types, such as a musical doorbell and an electronic doorbell, the doorbell device installation method has not changed.

In the construction of a building, two installation box holes are respectively disposed on proper positions of an outdoor wall and an indoor wall. Lines are disposed inside the wall, and are connected to the two installation box holes and an indoor power source (AC power), to respectively form a doorbell contact and a switch contact in the two installation box holes. Herein, a user can easily accomplish the installation of the doorbell device by respectively connecting the doorbell and the switch to the doorbell contact and the switch contact, and fastening the doorbell and the switch to the indoor and outdoor installation box holes.

FIG. 1 is a schematic diagram of a conventional doorbell device. Referring to FIG. 1, the conventional doorbell device mainly consists of an AC power source ACP, a switch button SW, and a conventional doorbell 1. The switch button SW is coupled between the AC power source ACP and the conventional doorbell 1. The AC power source ACP supplies AC power to the convention doorbell 1 through the switch button SW. The conventional doorbell 1 generates sound by triggering an operation to have a current coil generate magnetic force forcing an iron bar to impact an iron sheet.

FIG. 2 is a schematic diagram of another conventional doorbell device. Referring to FIG. 2, another conventional doorbell device mainly consists of an AC power source ACP, a switch button SW, a diode D1, and an electronic doorbell 2. The switch button SW is coupled between the AC power source ACP and the electronic doorbell 2, and the diode D1 is bridged over two ends of the switch button SW. The AC power source ACP supplies AC power to the electronic doorbell 2 through the switch button SW and the diode D1 so as to have the electronic doorbell 2 generate electronic sound.

With the improvement of technology, buildings of general residences, office buildings, or apartment buildings are more or less provided with, in addition to doorbells, some security devices, e.g., electronic devices such as intercoms, pagers, fire protection equipments, access control devices, monitors, and broadcasters, so as to ensure the security and safety of buildings, workplaces, or living environments. Additionally, the buildings must be provided with additional lines for supplying power to these added security devices; consequently, the installation of lines is quite inconvenient.

SUMMARY

According to an embodiment, a power supply device sharing power of a doorbell comprises two power contacts, an AC switch, an AC/DC conversion circuit, a doorbell actuator, a supply node, an enabling node, and a control node. The two power contacts are respectively connected to two doorbell switch contacts. The AC switch is coupled between the two power contacts. The AC/DC conversion circuit is connected in parallel between the two power contacts along with the AC switch and is coupled between the two power contacts and the supply node. The doorbell actuator is coupled between the AC/DC conversion circuit and the enabling node. The control node is coupled to the AC switch. Herein, the AC switch is normally off. When the AC switch is off, the AC/DC conversion circuit receives AC power via the two power contacts, generates DC power according to the AC power, and then outputs the DC power through the supply node. The doorbell actuator generates an enabling signal and outputs the enabling signal through the enabling node. The control node receives a control signal relative to the enabling signal, and the AC switch is on according to the control signal.

According to an embodiment, an electronic system sharing power of a doorbell comprises the aforementioned power supply device, a control unit, and at least one functional circuit. The control unit is coupled to the supply node, the enabling node, and the control node of the power supply device and the at least one functional circuit. The control unit controls an operation of the functional circuit and generates the control signal according to the enabling signal. Herein, the control unit and the functional circuit are supplied by the DC power outputted by the power supply device.

According to an embodiment, a power supply method sharing power of a doorbell comprises: receiving AC power from two doorbell switch contacts of the doorbell; outputting DC power to supply at least one functional circuit according to the AC power; generating an enabling signal by a doorbell actuator; generating a control signal according to the enabling, signal; and connecting the two doorbell switch contacts to each other in response to the control signal to drive the doorbell by the AC power.

Concisely, according to some embodiments of the electronic system sharing power of the doorbell, the power supply device thereof, and the power supply method thereof, power supplied to the doorbell can be supplied to other devices for operating without affecting the normal use of the doorbell. Additionally, according to some embodiments of the electronic system sharing power of the doorbell, the power supply device thereof, and the power supply method thereof, components can be conveniently installed on existing installation box holes of switches of buildings, and there is no need to install additional power supply lines on the buildings.

DETAILED DESCRIPTION

Figure 1:
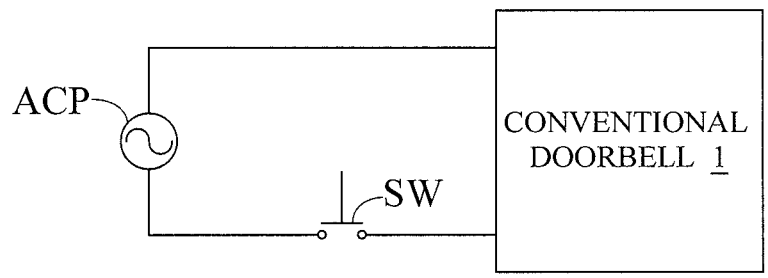
FIG. 1 illustrates a schematic diagram of a conventional doorbell device.
Figure 2:
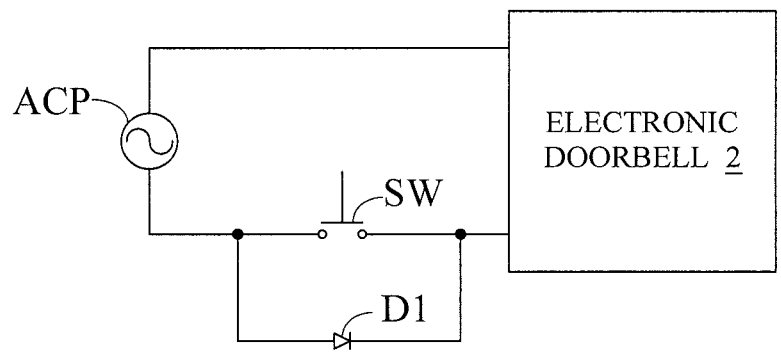
FIG. 2 illustrates a schematic diagram of another conventional doorbell device.
Figure 3:
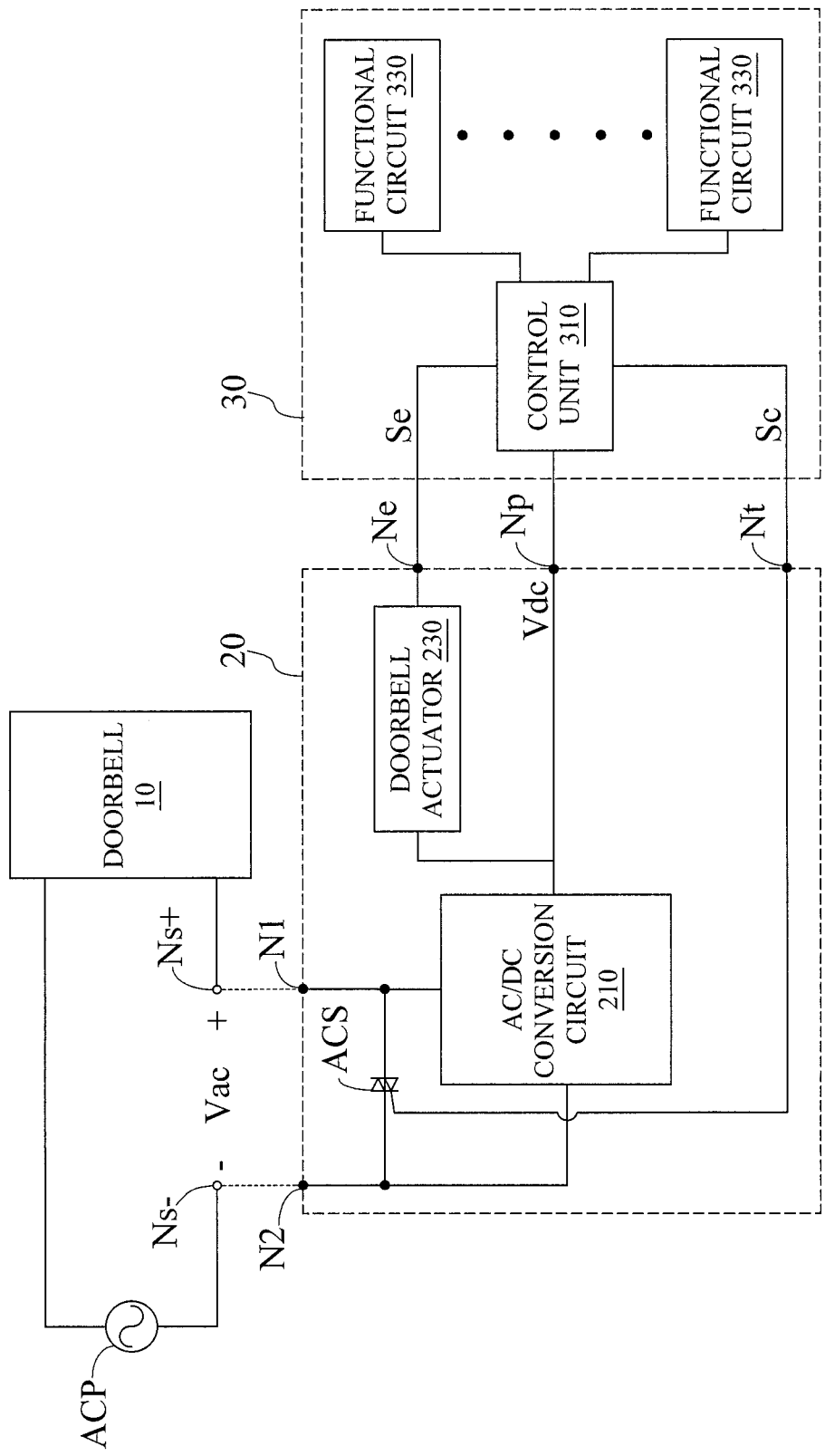
FIG. 3 illustrates a schematic diagram of an electronic system sharing power of a doorbell according to a first embodiment of the instant disclosure.
Figure 4:
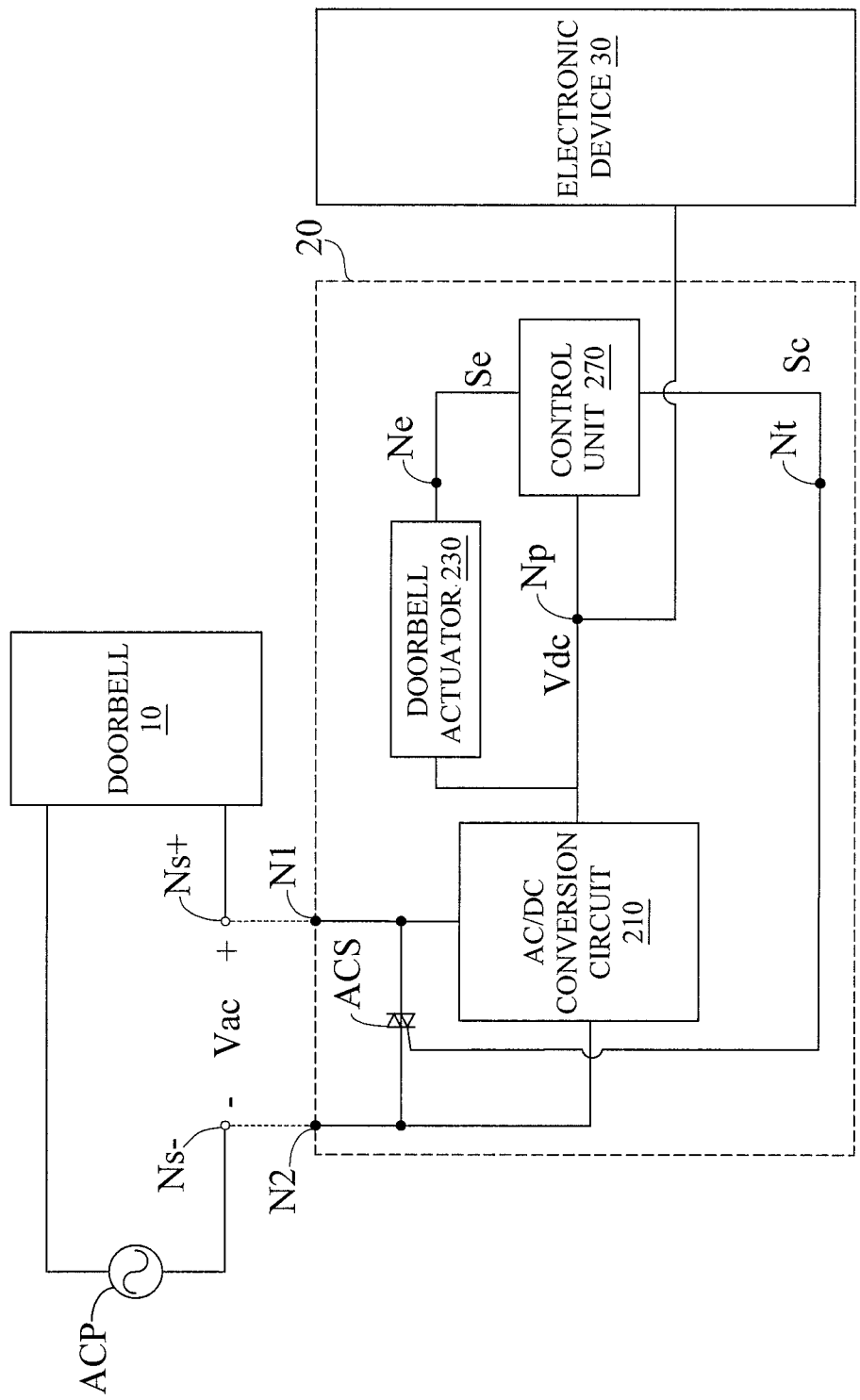
FIG. 4 illustrates a schematic diagram of an electronic system sharing power of a doorbell according to a second embodiment of the instant disclosure.

FIG. 3 is a schematic diagram of an electronic system sharing power of a doorbell according to a first embodiment of the instant disclosure. FIG. 4 is a schematic diagram of an electronic system sharing power of a doorbell according to a second embodiment of the instant disclosure. Referring to FIG. 3 and FIG. 4, the electronic system comprises a power supply device 20.

The power supply device 20 comprises two power contacts N1, N2, an AC switch ACS, an AC/DC conversion circuit 210, a doorbell actuator 230, a supply node Np, an enabling node Ne, and a control node Nt. A first end of the AC switch ACS and a first input end of the AC/DC conversion circuit 210 are coupled to the power contact N1. A second end of the AC switch ACS and a second input end of the AC/DC conversion circuit 210 are coupled to the power contact N2. In other words, the AC/DC conversion circuit 210 is connected in parallel between the two power contacts N1, N2 along with the AC switch ACS. A control end of the AC switch is coupled to the control node Nt and is coupled to an output end of a control unit (such as a control unit 310 as shown in FIG. 3 or a control unit 270 as shown in FIG. 4), through the control node Nt. An output end of the AC/DC conversion circuit 210 is coupled to the supply node Np and is coupled to a power end of the control unit 310/270 through the supply node Np. The doorbell actuator 230 is coupled between the AC/DC conversion circuit 210 and the enabling node Ne, and is coupled to a receiving end of the control unit 310/270 through the enabling node Ne.

For use, the power contact N1 is directly connected to a doorbell switch contacts Ns+, and the power contact N2 is directly connected to a doorbell switch contacts Ns−. In other words, the power contact N1 and the doorbell switch contacts Ns+ have the same electric potential, and the power contact N2 and the doorbell switch contacts Ns− have the same electric potential. In some embodiments, the power supply device 20 replaces a switch of a conventional doorbell device and is directly connected to the doorbell switch contacts Ns+, Ns− preserved on a building. The doorbell switch contacts Ns+, Ns− are coupled to a doorbell 10 and the AC power source ACP, e.g., an indoor power source inside the building, through conduction lines. Additionally, the AC power source ACP can supply AC power Vac between the doorbell switch contacts Ns+, Ns−. In other words, the AC power source ACP supplies the AC power Vac between the two power contacts N1, N2 when the power contacts N1, N2 are connected to the doorbell switch contacts Ns+, Ns−. In some embodiments, the AC power source ACP can be the combination of the power grid and a converter (not shown), and the power grid provides 110V-220V AC which is then converted to the AC power Vac adapted to the doorbell 10 through the converter. As a specific example, the AC power Vac can be 8V-24V AC.

The AC switch ACS is normally off. When the AC switch ACS is off, the AC/DC conversion circuit 210 receives the AC power Vac through the power contacts N1, N2 and generates DC power Vdc according to the AC power Vac. The AC/DC conversion circuit 210 outputs the DC power Vdc to a post-stage circuit through the supply node Np to supply the post-stage circuit for operating. The post-stage circuit can be the control unit 310/270, an electronic device 30, the doorbell actuator 230, or the combination thereof.

When the doorbell actuator 230 is actuated, e.g., being pressed, scanning physiological characteristics, or receiving a set of inputted passwords, the doorbell actuator 230 generates an enabling signal Se and outputs the enabling signal Se to the control unit 310/270 through the enabling node Ne. The control unit 310/270 generates a control signal Sc according to the received enabling signal Se and transmits the control signal Sc to the control end of the AC switch ACS through the control node Nt. When the AC switch ACS receives the control signal Sc, the AC switch ACS is turned on in response to the control signal Sc. Thus, the doorbell 10 receives the AC power Vac to ring (to make sound).

In some embodiments, the control unit 310 can be disposed in the electronic device 30, which is located outside the power supply device 20, as shown in FIG. 3.

In some embodiments, referring to FIG. 3, the electronic device 30 comprises the control unit 310 and one or more functional circuits 330. Although the drawing shows a plurality of functional circuits 330, but the number of the functional circuit 330 of the instant disclosure is not limited. That is to say, the electronic device 30 can have only one functional circuit 330 to match practical needs rather than have the plurality of functional circuits 330. Additionally, in some embodiments, if the electronic device 30 has the plurality of functional circuits 330, these functional circuits 330 can provide varied functions different from each other or can provide the same function. Alternatively, some of the functional circuits 330 provide varied functions different from each other, and some of the functional circuits 330 provide the same function.

The control unit 310 is coupled to each of the functional circuits 330, and the control unit 310 is coupled to the supply node Np, the enabling node Ne, and the control node Nt. In the instant embodiment, the control unit 310 controls operation of each of the functional circuits 330. The control unit 310 receives the DC power Vdc from the power supply device 20 through the supply node Np and supplies components (e.g., the control unit 310 and the functional circuits 330) of the electronic device 30 for operating by the DC power Vdc. Additionally, the control unit 310 generates and outputs the control signal Sc to the control node Nt according to the enabling signal Se when the control unit 310 receives the enabling signal Se through the enabling node Ne.

In other embodiments, the control unit (such as the control unit 270) can be disposed in the power supply device 20, as shown in FIG. 4. In the embodiment, in accordance with FIG. 4, the external electronic device 30 and the control unit 270 can receive the DC power Vdc through the supply node Np and can be supplied by the DC power Vdc for operating. Additionally, the control unit 270 generates and outputs the control signal Sc to the control node Nt according to the enabling signal Se when the control unit 270 receives the enabling signal Se through the enabling node Ne.

In some embodiments, the doorbell actuator 230 can be a switch button, a characteristic recognizer, a magnetic card sensor, or a password input unit, and the characteristic recognizer can be a fingerprint recognizer, a pupil recognizer, a voice recognizer, or a face recognizer, or the like.

For example, the doorbell actuator 230 of an embodiment can be a switch button. When the switch button is pressed (is turned on), the control unit 270/310 detects that the switch button is pressed through the enabling node Ne and outputs the control signal Sc to control the AC switch ACS to be turned on in response to the result of the detection, such that the doorbell 10 rings.

For another example, the doorbell actuator 230 of another embodiment can be a characteristic recognizer, and the doorbell actuator 230 can also be supplied by the DC power Vdc for operating. When the characteristic recognizer scans a physiological characteristic, the doorbell actuator 230 outputs the enabling signal Se to the control unit 270/310 according to the physiological characteristic. Herein, the doorbell actuator 230 can directly provide the scanned physiological characteristic, i.e., the aforementioned enabling signal Se, to the control unit 270/310, and the control unit 270/310 determines whether the physiological characteristic belongs to existing personnel, e.g., whether the physiological characteristic matches a preset physiological characteristic stored in a storage unit. Or alternatively, the step of the determination can be executed by the doorbell actuator 230, and the doorbell actuator 230 outputs the result of the determination, i.e., the aforementioned enabling signal Se, to the control unit 310. Then, the control unit 310 outputs the control signal Sc according to the result of the determination so as to control the AC switch ACS to be turned on. As a specific application, an electronic system of an embodiment is configured to ring the doorbell 10 when a visitor is unknown. The control unit 310 controls the AC switch ACS to be turned on to ring the doorbell 10 if the result of the determination indicates that the visitor is unknown; on the other hand, the control unit 310 controls a door lock to be unlocked through the functional circuit 330 so as to allow a gate capable of being opened if the result of the determination indicates that the physiological characteristic of the incoming people belongs to existing personnel. For other applications, an electronic system of another embodiment can also be configured to ring the doorbell 10 when the doorbell actuator 230 scans a physiological characteristic. The doorbell actuator 230 outputs the enabling signal Se to the control unit 310 when the doorbell actuator 230 scans the physiological characteristic. When the control unit 310 receives the enabling signal Se from the doorbell actuator 230, the control unit 310 controls the AC switch ACS to be turned on such that the doorbell 10 rings. In other embodiments, the practice of the magnetic card sensor or the password input unit can be more or less the same as that of the characteristic recognizer.

In some embodiments, an energy storage unit can be used to stably supply the DC power Vdc to the post-stage circuit, and the energy storage unit can be a battery or a capacitor.

For example, under the circumstance that the post-stage circuit is a device requiring continuously power supplying, the energy storage unit can supply the post-stage circuit for operating when the AC switch ACS is on. Alternatively, the energy storage unit assists to supply the post-stage circuit for operating when the current of the DC power Vdc outputted by the AC/DC conversion circuit 210 is low, e.g., being lower than the consumption of the post-stage circuit for operating. Alternatively, the energy storage unit is used to complement the consumption of the post-stage circuit for operating when the load of the post-stage circuit instantaneously gains.

Figure 5:
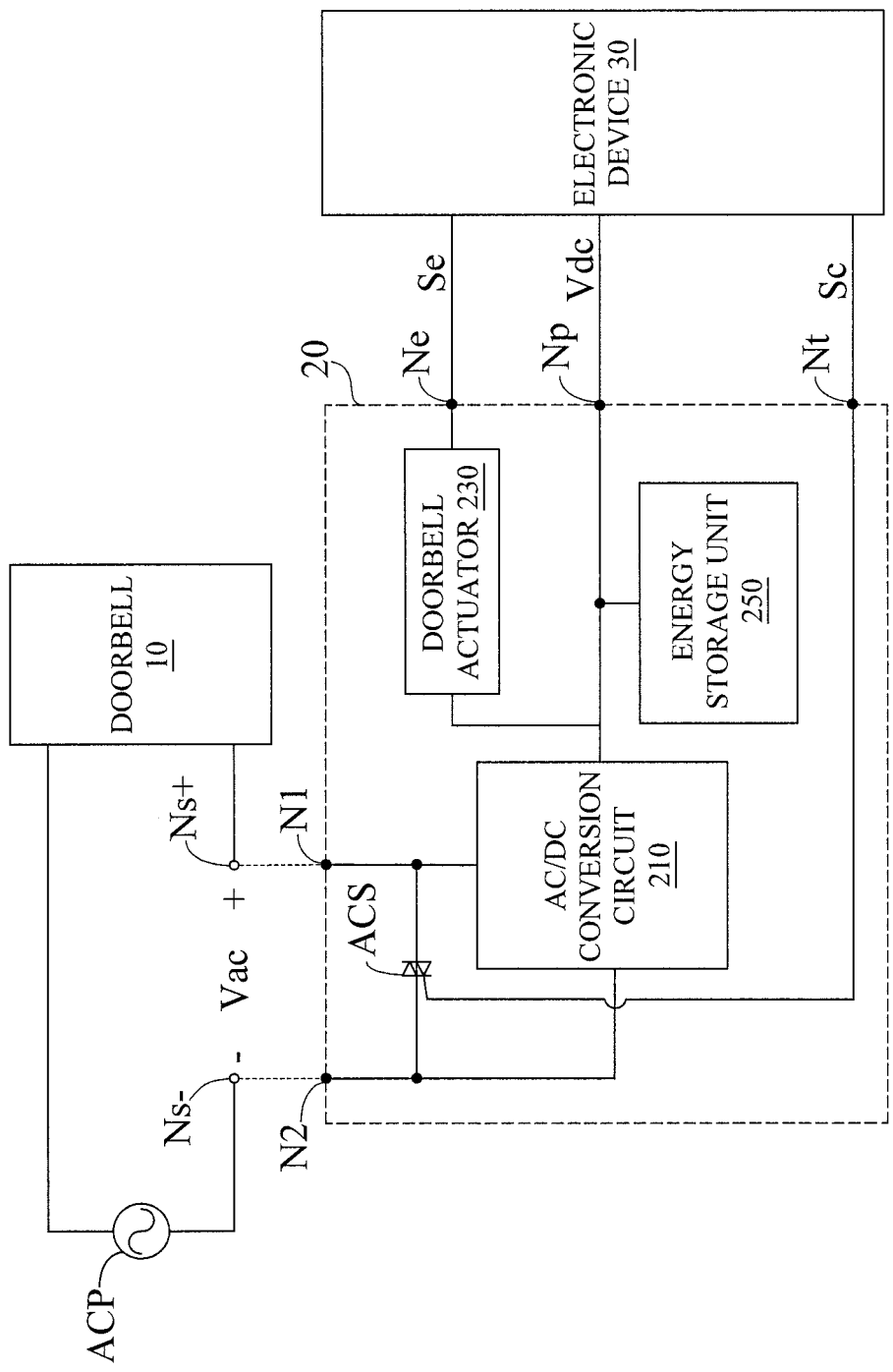
FIG. 5 illustrates a schematic diagram of an electronic system sharing power of a doorbell according to a third embodiment of the instant disclosure.

FIG. 5 is a schematic diagram of an electronic system sharing power of a doorbell according to a third embodiment of the instant disclosure. In some embodiments, the energy storage unit can be disposed in the power supply device 20. Referring to FIG. 5, the power supply device 20 can further comprise the energy storage unit 250, and the energy storage unit 250 is coupled between the AC/DC conversion circuit 210 and the supply node Np. The energy storage unit 250 is charged according to the DC power outputted by from AC/DC conversion circuit 210 when the AC switch ACS is off. The energy storage unit 250 is discharged to provide the DC power Vdc to the post-stage circuit through the supply node Np when the AC switch ACS is on.

Figure 6:
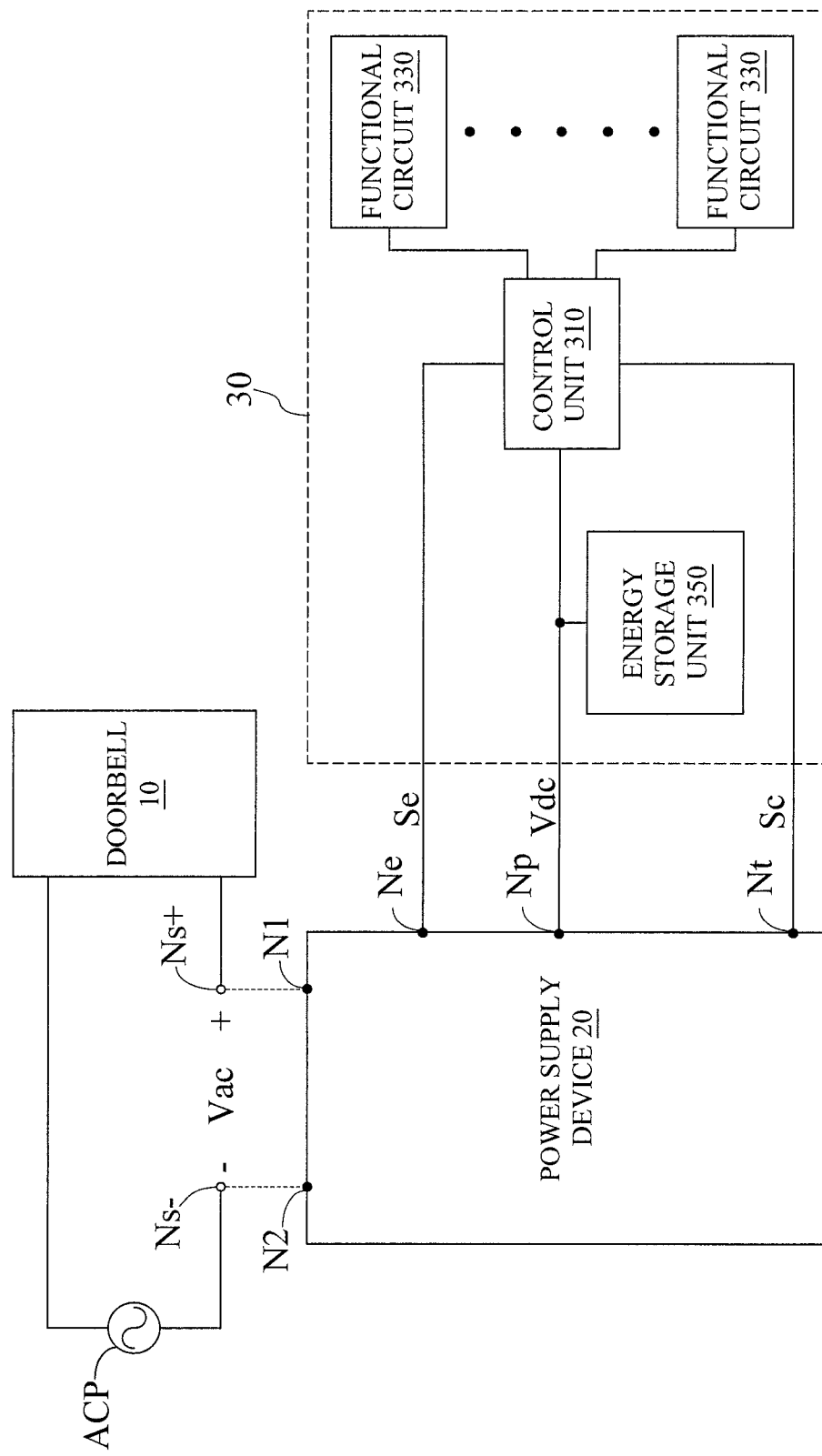
FIG. 6 illustrates a schematic diagram of an electronic system sharing power of a doorbell according to a fourth embodiment of the instant disclosure.

FIG. 6 is a schematic diagram of an electronic system sharing power of a doorbell according to a fourth embodiment of the instant disclosure. In some embodiments, the energy storage unit can be disposed in the electronic device 30. Referring to FIG. 6, the electronic device 30 can further comprise the energy storage unit 350, and the energy storage unit 350 is coupled between the supply node Np and the control unit 310. Herein, the operation of the energy storage unit 350 is more or less as mentioned above.

Figure 7:
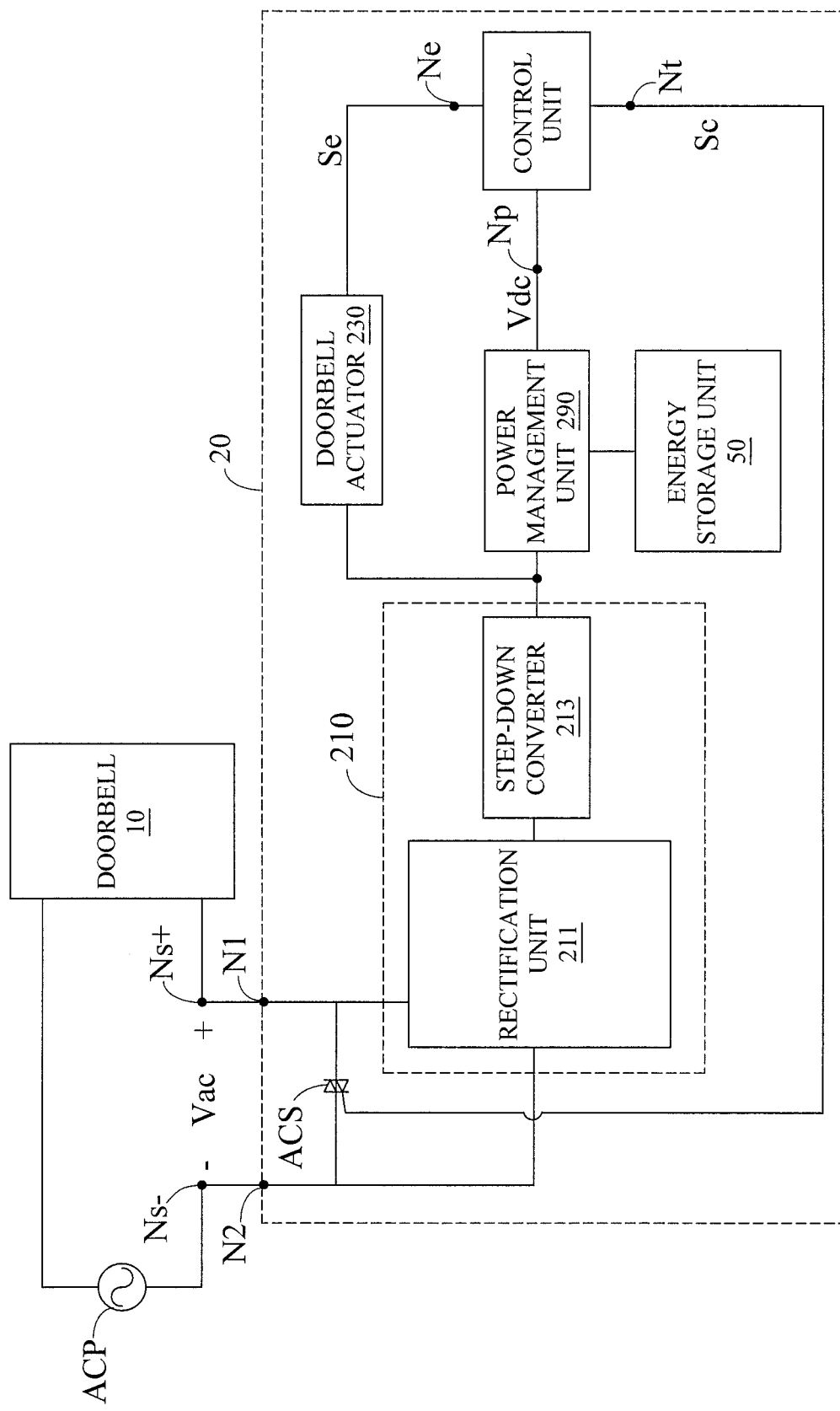
FIG. 7 illustrates a schematic diagram of an electronic system sharing power of a doorbell according to a fifth embodiment of the instant disclosure.

FIG. 7 is a schematic diagram of an electronic system sharing power of a doorbell according to a fifth embodiment of the instant disclosure. In some embodiments, referring to FIG. 7, the power supply device 20 can further comprise a power management unit 290. The power management unit 290 is an output stage of the power supply device 20. The power management unit 290 is coupled between the AC/DC conversion circuit 210 and the supply node Np. The power management unit 290 is for transmitting the DC power Vdc to the supply node Np and limiting amperage of the DC power Vdc outputted to the post-stage circuit.

In some embodiments, when the electronic system comprises an energy storage unit 50 of any of the aforementioned embodiments, i.e., the energy storage unit 250 or 350, the power management unit 290 is further coupled to the energy storage unit 50. Additionally, the power management unit 29 charges the energy storage unit 50 by the DC power Vdc when the AC switch ACS is off.

Herein, the doorbell actuator 230, according to practical needs, can be coupled between an input end of the power management unit 290 and the enabling node Ne (as shown in FIG. 7), or can be coupled between an output end of the power management unit 290 and the enabling node Ne (not shown).

Figure 8:
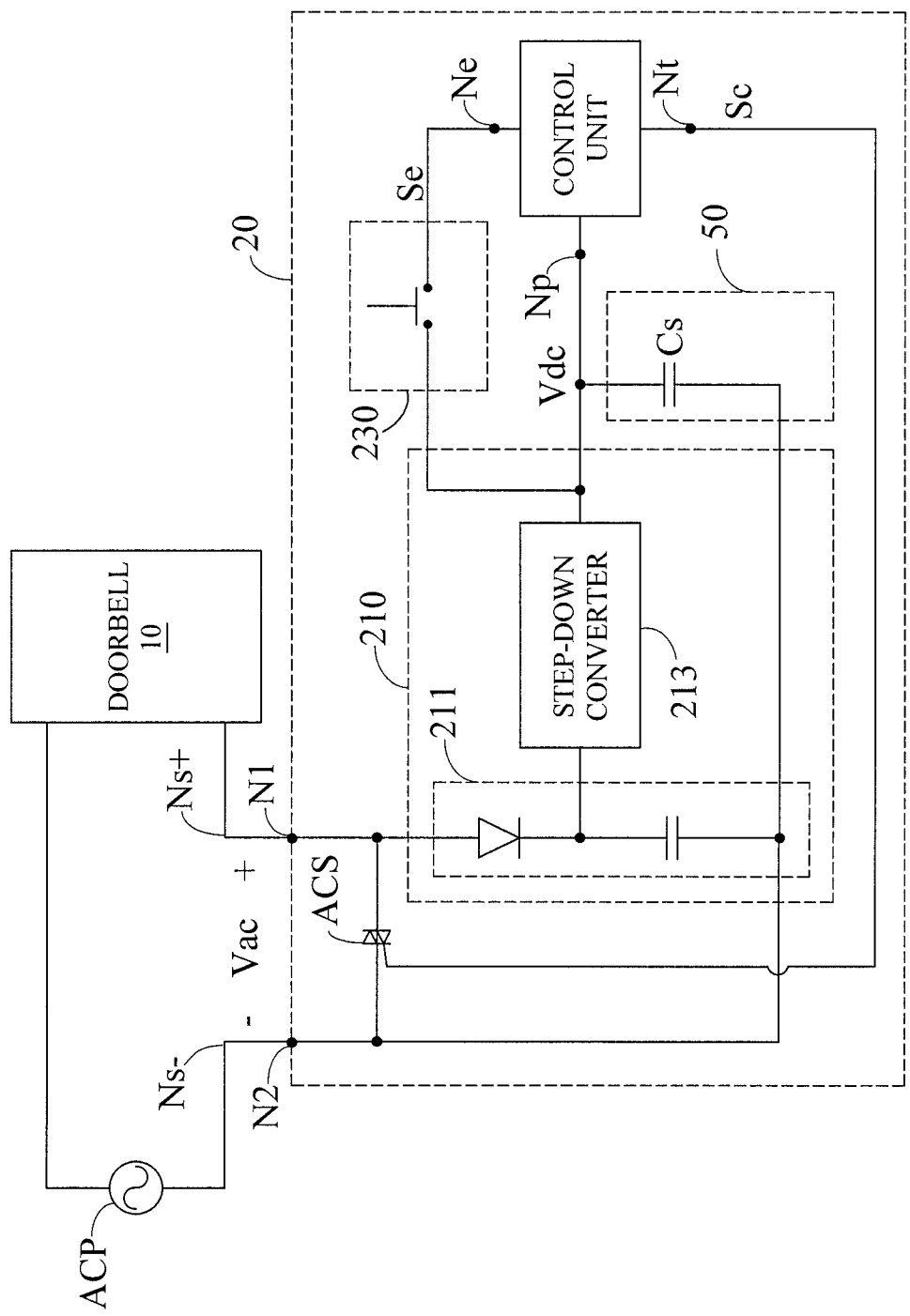
FIG. 8 illustrates a schematic diagram of an AC/DC conversion circuit and an energy storage unit according to an embodiment.
Figure 9:
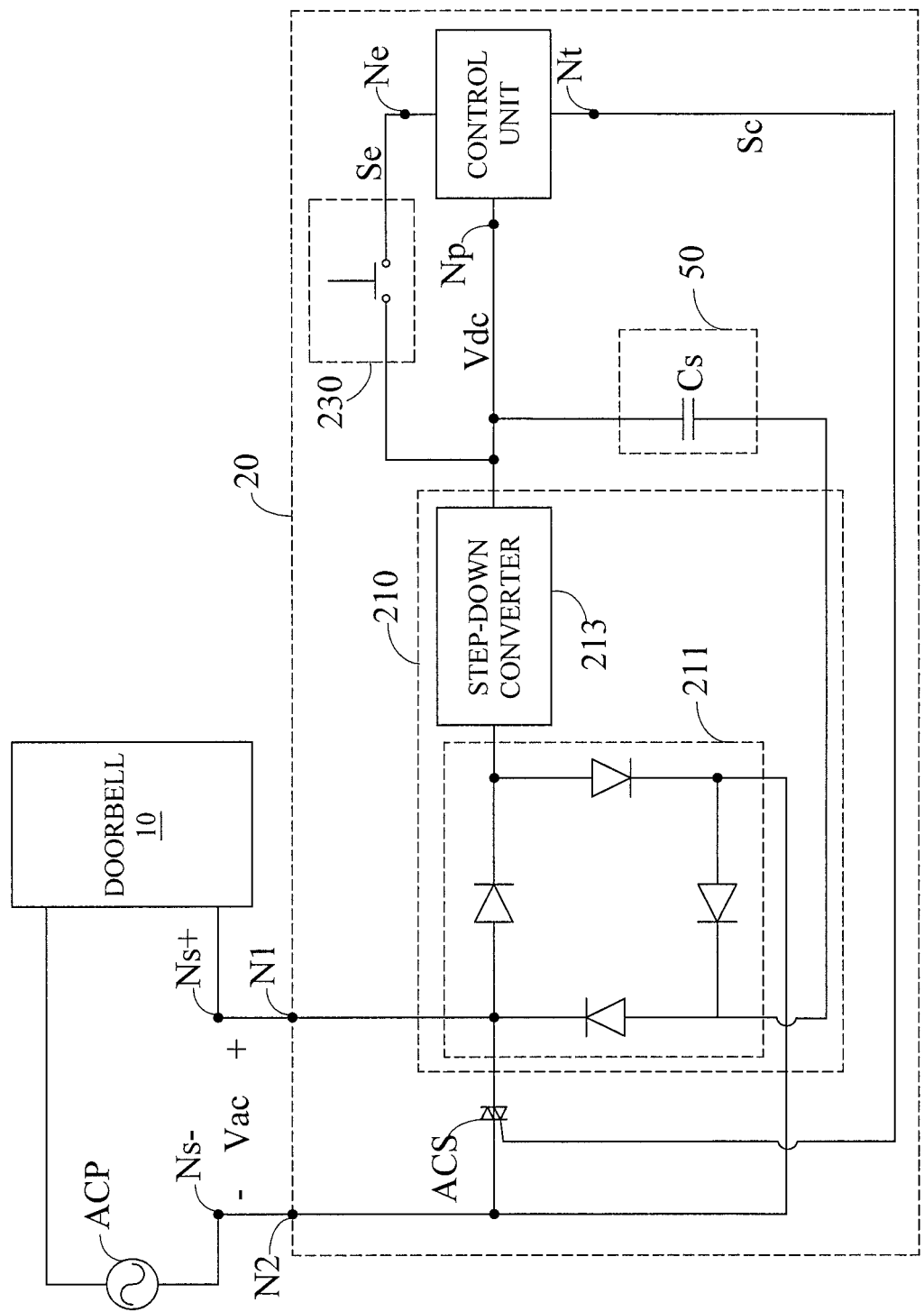
FIG. 9 illustrates a schematic diagram of an AC/DC conversion circuit according to another embodiment.

FIG. 8 is a schematic diagram of the AC/DC conversion circuit 210 and the energy storage unit 50 according to an embodiment. FIG. 9 is a schematic diagram of the AC/DC conversion circuit 210 according to another embodiment. In some embodiments, referring to FIGS. 8 and 9, the AC/DC conversion circuit 210 comprises a rectification unit 211. The rectification unit 211 is connected in parallel between the two power contacts N1, N2 along with the AC switch ACS. The rectification unit 211 is coupled between the power contacts N1, N2 and the supply node Np. The rectification unit 211 receives the AC power Vac and converts the AC power Vac into the DC power Vdc. Wherein, the rectification unit 211 can be a half-wave rectifier (as shown in FIG. 8), or a full-wave rectifier (as shown in FIG. 9).

In some embodiments, the AC/DC conversion circuit 210 can further comprise a step-down converter 213. The step-down converter 213 is coupled between the rectification unit 211 and the supply node Np. The step-down converter 213 is for stepping down voltage level of the DC power Vdc to supply the post-stage circuit, such as the control unit 270/310 and the functional circuit 330, with suitable voltage. For example, the step-down converter 213 can step down the DC power Vdc to 3V or 5V and then output the stepped-down DC power Vdc of which the voltage is 3V or 5V to the supply node Np.

In some embodiments, the energy storage unit 50 at least comprises a capacitor Cs. The capacitor Cs is coupled to the supply node Np and the AC/DC conversion circuit 210. When the AC/DC conversion circuit 210 generates the DC power Vdc, the DC power Vdc not only supplies the post-stage circuit, but also charges the capacitor Cs.

Figure 10:
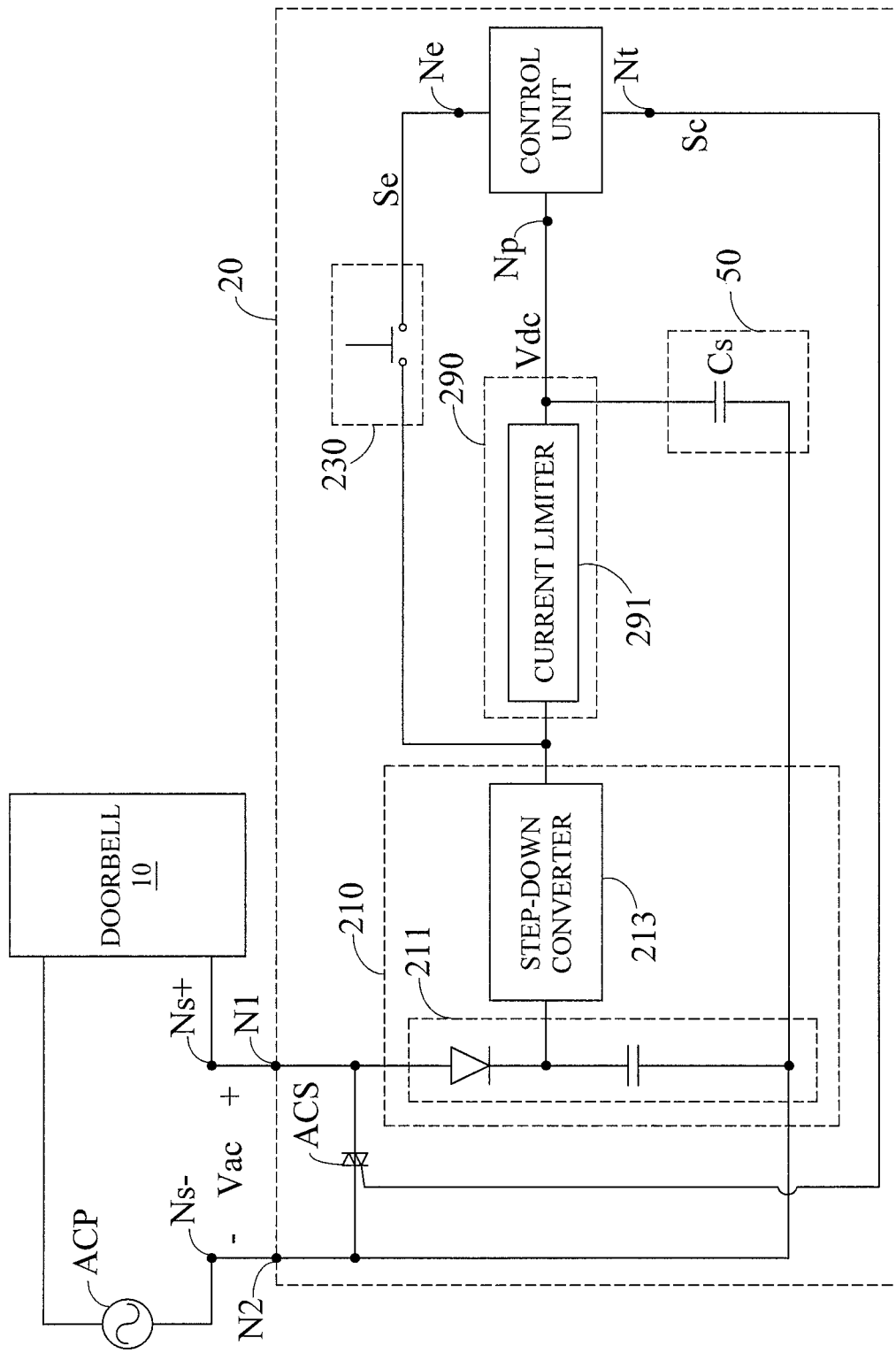
FIG. 10 and FIG. 11 each illustrates a schematic diagram of a power management unit according to an embodiment.
Figure 11:
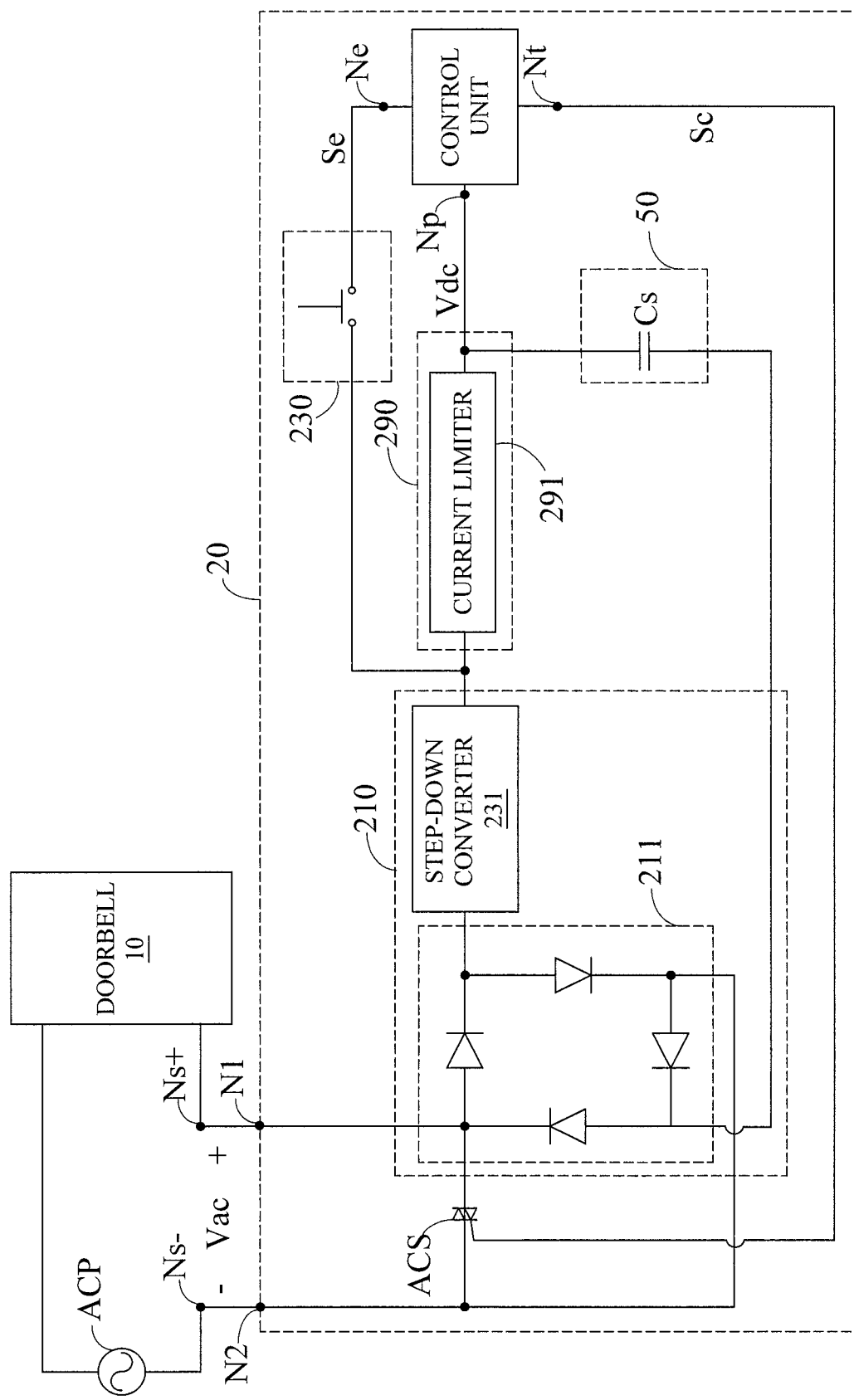

FIG. 10 and FIG. 11 are schematic diagrams of the power management unit 290 according to an embodiment. In some embodiments, referring to FIGS. 10 and 11, the power management unit 290 can comprise a current limiter 291. The current limiter 291 is coupled between the AC/DC conversion circuit 210 and the supply node Np. Herein, the current limiter 291 is for limiting amperage of the DC power Vdc outputted from the supply node Np to prevent the post-stage circuit from receiving too much current to cause incorrect operation or damage and to prevent the doorbell 10, e.g., a conventional doorbell using a current coil to trigger an impact, from receiving too much current to cause incorrect operation.

In some embodiments, the AC switch ACS can be a tri-electrode AC switch (TRIAC).

In some embodiments, the current limiter 291 can be a transistor, a diode, or a resistor.

In some embodiments, the functional circuit 330 can be a monitor, a wireless module, an indicator, a sensor, an IR-Cut filter removable (ICR), a storage unit, a panel, a microphone module, a speaker, a door lock, an intercom, a pager, or a drive circuit of a fire protection equipment. The indicator is, for example, a light-emitting diode (LED). The sensor is, for example, a light sensor, an image sensor, an IR sensor, or a touch sensor. The storage unit is, for example, a secure digital (SD) card, a memory, or an auxiliary storage device, e.g., a combination of an optical disk and an optical disk drive or a magnetic disk. The memory is, for example, a random access memory (RAM), a read only memory (ROM), or a cache memory.

In some embodiments, the doorbell 10 can be a conventional doorbell, a musical doorbell, or an electronic doorbell.

Concisely, according to some embodiments of the power supply device sharing power of the doorbell, the electronic system thereof, and the power supply method thereof, power supplied to the doorbell can be supplied to other devices for operating without affecting the normal use of the doorbell. Additionally, according to some embodiments of the power supply device sharing power of the doorbell, the electronic system thereof, and the power supply method thereof, components can be conveniently installed on existing installation box holes of switches of buildings, and there is no need to install additional power supply lines on the buildings.

While the instant disclosure has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. A power supply device sharing power of a doorbell, comprising:
    two power contacts configured to be respectively connected to two doorbell switch contacts;
    an AC switch coupled between the two power contacts and configured to be on according to a control signal, wherein the AC switch is normally off;
    a supply node configured to output DC power;
    an AC/DC conversion circuit connected in parallel between the two power contacts along with the AC switch, coupled between the two power contacts and the supply node, input ends of the AC/DC conversion circuit are coupled to the two power contacts and to two ends of the AC switch, output end of the AC/DC conversion circuit is coupled to the supply node, and configured to when the AC switch is off, receive AC power via the two power contacts and to generate the DC power according to the AC power;
    an enabling node;
    a doorbell actuator coupled between the output end of the AC/DC conversion circuit and the enabling node and configured to generate an enabling signal and output the enabling signal via the enabling node; and
    a control node coupled to control end of the AC switch and configured to receive the control signal, wherein the control signal is relative to the enabling signal.

2. The power supply device sharing power of a doorbell of claim 1 further comprising:
    a control unit coupled to the supply node, the enabling node, and the control node and configured to generate the control signal according to the enabling signal, wherein the control unit is supplied by the DC power.

3. The power supply device sharing power of a doorbell of claim 2, wherein the AC/DC conversion circuit comprises:
    a rectification unit connected in parallel between the two power contacts along with the AC switch.

4. The power supply device sharing power of a doorbell of claim 3, wherein the AC/DC conversion circuit further comprises:
    a step-down converter coupled between the rectification unit and the supply node.

5. The power supply device sharing power of a doorbell of claim 1, wherein the AC/DC conversion circuit comprises:
    a rectification unit connected in parallel between the two power contacts along with the AC switch.

6. The power supply device sharing power of a doorbell of claim 5, wherein the AC/DC conversion circuit further comprises:
    a step-down converter coupled between the rectification unit and the supply node.

7. The power supply device sharing power of a doorbell of claim 1, further comprising:
a power management unit coupled between the AC/DC conversion circuit and the supply node and configured to transmit the DC power and to limit amperage of the DC power.

8. The power supply device sharing power of a doorbell of claim 7, wherein the power management unit comprises:
a current limiter coupled between the AC/DC conversion circuit and the supply node.

9. The power supply device sharing power of a doorbell of claim 1, further comprising:
an energy storage unit coupled between the AC/DC conversion circuit and the supply node, wherein the energy storage unit is charged according to the DC power when the AC switch is off, and wherein the energy storage unit is discharged to provide the DC power when the AC switch is on.

10. The power supply device sharing power of a doorbell of claim 9, further comprising:
a power management unit coupled between the AC/DC conversion circuit, the energy storage unit, and the supply node and configured to transmit the DC power, to limit amperage of the DC power, and to charge the energy storage unit by the DC power when the AC switch is off.

11. The power supply device sharing power of a doorbell of claim 10, wherein the power management unit comprises:
a current limiter coupled between the AC/DC conversion circuit and the supply node.

12. An electronic system sharing power of a doorbell, comprising:
a power supply device comprising:
two power contacts configured to be respectively connected to two doorbell switch contacts;
an AC switch coupled between the two power contacts and configured to be on according to a control signal, wherein the AC switch is normally off;
a supply node configured to output DC power;
an AC/DC conversion circuit connected in parallel between the two power contacts along with the AC switch, coupled between the two power contacts and the supply node, input ends of the AC/DC conversion circuit are coupled to the two power contacts and to two ends of the AC switch, output end of the AC/DC conversion circuit is coupled to the supply node, and configured to when the AC switch is off, receive AC power via the two power contacts and to generate the DC power according to the AC power;
an enabling node;
a doorbell actuator coupled between the output end of the AC/DC conversion circuit and the enabling node and configured to generate an enabling signal and output the enabling signal via the enabling node; and
a control node coupled to control end of the AC switch and configured to receive the control signal, wherein the control signal is relative to the enabling signal;
at least one functional circuit; and
a control unit coupled to the supply node, the enabling node, and the control node of the power supply device and the at least one functional circuit and configured to control operation of the at least one functional circuit and to generate the control signal according to the enabling signal, wherein the control unit and the at least one functional circuit are supplied by the DC power.

13. The electronic system sharing power of a doorbell of claim 12, wherein the power supply device further comprises:
an energy storage unit coupled to the supply node, wherein the energy storage unit is charged according to the DC power when the AC switch is off, and wherein the energy storage unit is discharged to provide the DC power when the AC switch is on.

14. A power supply method sharing power of a doorbell, comprising:
receiving, by an AC/DC conversion circuit, AC power from two doorbell switch contacts of the doorbell, wherein input ends of the AC/DC conversion circuit are coupled to the AC power, and an AC switch is coupled to and between the input ends of the AC/DC conversion circuit;
outputting, by the AC/DC conversion circuit, DC power to supply at least one functional circuit according to the AC power;
generating, by a doorbell actuator, an enabling signal based on the DC power when the doorbell actuator is actuated;
generating and outputting a control signal to the AC switch according to the enabling signal; and
connecting the two doorbell switch contacts to each other through switching the AC switch to be on in response to the control signal to drive the doorbell by the AC power.

15. The power supply method sharing power of a doorbell of claim 14, further comprising:
charging an energy storage unit according to the DC power; and
supplying the at least one functional circuit by the energy storage unit when the two doorbell switch contacts are connected.

16. The power supply method sharing power of a doorbell of claim 14, wherein the step of outputting DC power to supply at least one functional circuit according to the received AC power comprises:
converting the AC power into the DC power by a rectification unit.

17. The power supply method sharing power of a doorbell of claim 16, wherein the step of outputting DC power to supply at least one functional circuit according to the received AC power further comprises:
stepping down voltage level of the DC power by a step-down converter; and
supplying the at least one functional circuit by the DC power that is stepped down.

18. The power supply method sharing power of a doorbell of claim 17, wherein the step of supplying the at least one functional circuit by the stepped-down DC power further comprising:
supplying the at least one functional circuit by the stepped-down DC power through a power management unit.

19. The power supply method sharing power of a doorbell of claim 16, wherein the step of outputting DC power to supply at least one functional circuit according to the received AC power further comprises:
supplying the functional circuit by the DC power through a power management unit.

* * * * *